Sept. 26, 1939.    R. R. STEVENS    2,173,954
BRAKE CONTROL DEVICE
Filed May 14, 1938
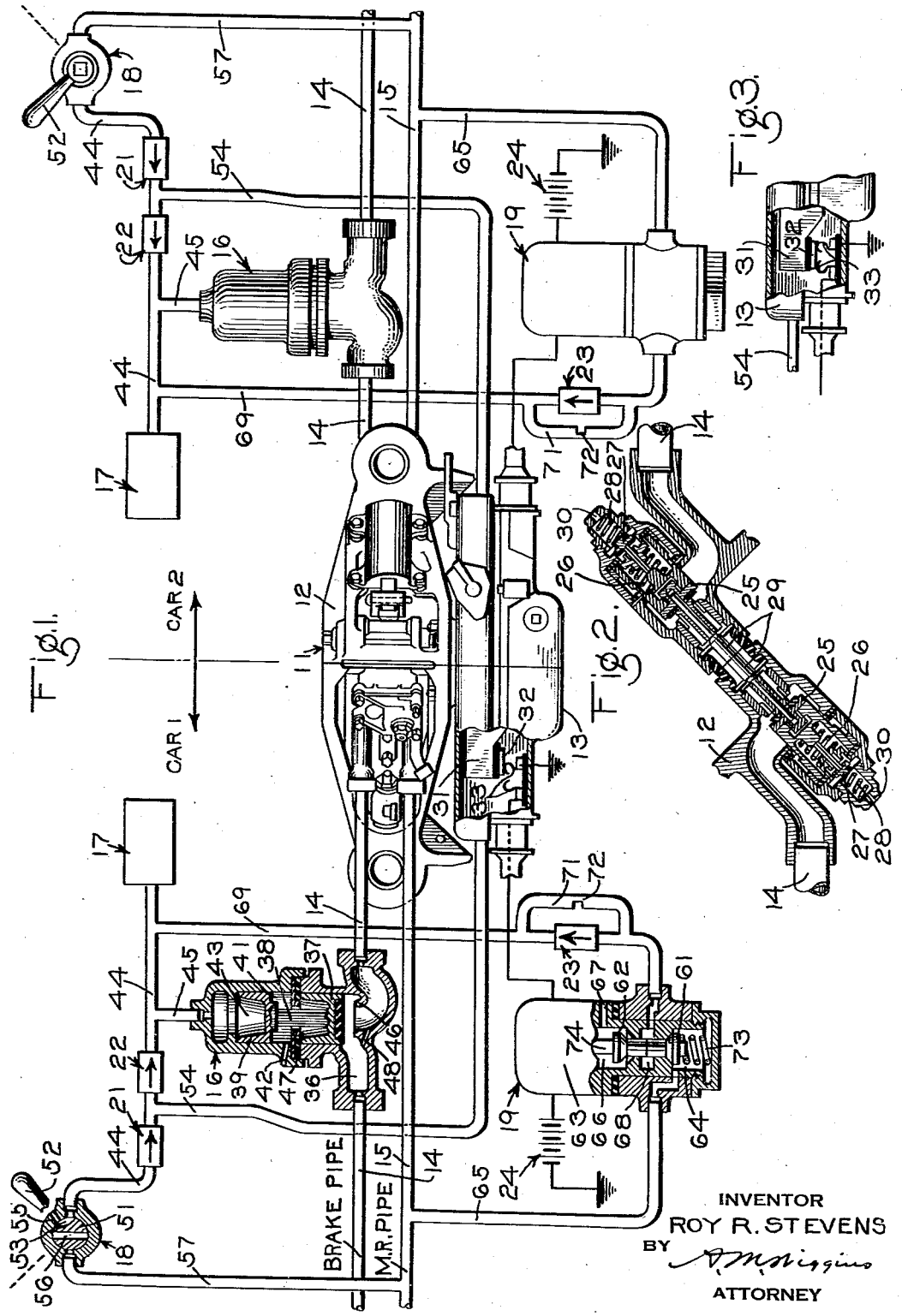
INVENTOR
ROY R. STEVENS
BY
*A. M. Higgins*
ATTORNEY Patented Sept. 26, 1939

2,173,954

UNITED STATES PATENT OFFICE 2,173,954

BRAKE CONTROL DEVICE

Roy R. Stevens, Forest Hills, Pa., assignor to The Westinghouse Air Brake Company, Wilmerding, Pa., a corporation of Pennsylvania Application May 14, 1938, Serial No. 207,947

17 Claims. (Cl. 213—76)

This invention relates to brake control devices for vehicles such as railway cars and has particular relation to brake control equipment in which pneumatic and electrical connections between the cars of a train are established and interrupted by automatically operable car couplers.

As is well known, conventional automatic car couplers, such as shown and described in Patent No. 1,571,222 and Patent No. 1,842,639 to H. F. Woernley, are provided with tappet valves on each of the counterpart portions of the coupler, which valves register wtih each other when the coupler parts are joined to effect mutual unseating of the valves to establish communication between the brake pipe section on one car and the brake pipe section on the adjacent car. During the coupling and uncoupling operation, these tappet valves are unseated while the counterpart portions of the coupler are unsealed and thus permit the escape of air from the brake pipe on the cars. As will be explained in detail later on this may cause a sufficiently sudden and rapid reduction of pressure in the brake pipe as to produce an undesired emergency application of the brakes on the cars, particularly when vent valve devices highly sensitive to sudden rapid reductions in brake pipe pressure are provided on the cars for effecting emergency applications of the brakes.

The primary object of my invention is accordingly to prevent the occurrence of undesired emergency applications of the brakes on the cars upon coupling or uncoupling of cars equipped with automatic couplers due to the undesired escape of air from the brake pipe on the cars at the coupler during the coupling or uncoupling operation.

Briefly, I accomplish the above object of my invention by providing in the usual brake pipe cut-off valve at each end of the car adjacent the coupler a restricted communication which by-passes the cut-off valve. Suitable control means, effective in accordance with the joining or separation of the counterpart portions of the coupler, is provided on each car for operating the cut-off valve on each car to closed position and maintaining it in closed position as long as the counterpart portions of the coupler are separated, and for restoring the cut-off valve to open position when the counterpart portions of the coupler are joined. A time delay means is provided for preventing the restoration of the cut-off valve to open position for a predetermined time following the joining of the coupler counterpart portions. The restricted by-pass communication around the cut-off valve prevents a sudden rapid reduction in brake pipe pressure due to the unseating of the tappet valves in the coupler upon coupling and uncoupling of the counterpart portions of the coupler, and the delay in the opening of the cut-off valve following joining of the coupler parts enables the vented end portions of the brake pipe between the cut-off valve and coupler to be charged sufficiently so that, when the cut-off valve does open, the reduction of pressure in the charged portion of the brake pipe on the cars, if indeed there is a reduction, is insufficient to produce or cause operation of the vent valve devices in the brake pipe resulting in undesired emergency applications of the brakes.

The above object, and other objects of my invention which will be made apparent hereinafter, are obtained by means of an illustrative embodiment of my invention subsequently to be described and shown in the accompanying drawing, wherein Fig. 1 is a diagrammatic view showing an automatic coupler and the associated control mechanism for preventing undesired emergency applications of the brakes upon coupling and uncoupling of the cars.

Fig. 2 is an enlarged sectional view showing the manner of connection of the brake pipe sections on adjacent cars through the couplers, and Fig. 3 is a fragmental view, with a portion broken away, of the electric portion of the coupler, showing the contact-carrying element in its retracted position as distinguished from the showing in Fig. 1 where it is in its projected position.

Description of equipment

Referring to Fig. 1, the equipment shown comprises an automatic car coupler, of the type shown in the above-mentioned Patents 1,571,222 and 1,842,639 to Woernley, for coupling two cars, referred to hereinafter as car 1 and car 2, and indicated as being to the left and right respectively of a center line through the coupler. The coupler comprises an upper air portion 12 for connecting the portions of a brake pipe 14 and a main reservoir pipe 15 on the two cars and a lower electric portion 13 for connecting the sections of train wires, not shown, on the two cars.

Additional equipment for each car includes a brake pipe cut-off valve 16 and an associated volume reservoir 17, together with a manually operable uncoupling valve 18 and a magnet valve device 19 for severally controlling the operation of the brake pipe cut-off vave 16, three one-way or check valves 21, 22 and 23, the purpose of which will be hereinafter explained, and a source of current such as a battery 24 for energizing the magnet valve 19.

Considering the parts of the equipment in greater detail, the upper air portion 12 and the lower electric portion 13 of the coupler 11 are described in detail as to construction and operation in the above mentioned patents, and accordingly only so much of their construction and operation as is deemed necessary to an understanding of my invention will be given herein.

As shown in Fig. 2, the sections of the brake pipe 14 on the cars are connected to registering passages in the air portion 12 of the coupler and contained in the passage in the part of the coupler on each car is a tappet valve 25 in the form of a valve piston which is urged to seated relation on an associated valve seat by a coil spring 26 and unseated from the valve seat when the portions of the coupler are joined, due to the engagement of the stems 29 of the valves. Associated with each tappet valve is a check valve 27 which is urged into seated relation on an annular rib seat by a coil spring 28. When the tappet valve 25 is unseated it causes unseating of valve 27 which accordingly causes venting of the back of the tappet valve 25 to atmosphere through a vent port 30.

The section of the main reservoir pipe 15 on car 1 is connected to the section of the main reservoir pipe 15 on car 2 by a similar arrangement of tappet valves, the description thereof being omitted as it is not essential to an understanding of my invention.

The electric portion of the coupler part on each car is provided with a shiftable contact-carrying element 31 which carries a plurality of contact pins to which train wires on the car are connected. As described in the above-mentioned patents, upon coupling of the two cars the contact-carrying element 31 on each car is automatically shifted in the direction of the face of the coupler, the two elements cooperating to connect the sections of the train wires a predetermined length of time after the connections between the sections of the brake pipe 14 and main reservoir pipe 15 on the two cars have been established. When uncoupling the cars, fluid under pressure supplied to an operating cylinder, not shown, within the electric portion 13 under the control of the manually operable unloading valve 18 causes retraction of the contact-carrying element 31 on each car away from the face of the coupler prior to the interruption of the connections between the sections of the brake pipe 14 and main reservoir pipe 15 on the two cars.

According to my invention, I provide on contact-carrying element 31 of the part of a coupler on each car a contact-bridging segment 32 which in the retracted position of the element connects a pair of contact fingers 33 mounted in spaced insulated relation on the casing of the electric portion 13, as shown in Fig. 3. When the contact-carrying element 31 is shifted to its projected position upon coupling of the cars, the contact-bridging segment 32 disengages one of the contact fingers 33 to interrupt an electrical circuit controlling the magnet valve device 19.

The brake pipe cut-off valve 16 on each car comprises a casing having therein a passage 36, to one end of which the section of the brake pipe 14 leading to the opposite end of the car is connected and to the opposite end of which the section of the brake pipe 14 leading to the coupler is connected, communication through the passage 36 being controlled by a valve piston 37 which is connected by a stem 38 to an operating piston 39. While valve piston 37 and the piston 39 are shown as of the same cross-sectional area, the piston 39 may be, and preferably is, larger in area than the valve piston 37 for a reason which will be made apparent presently. A chamber 41 formed between the piston 39 and the valve piston 37 is constantly connected to atmosphere through an exhaust port 42 and a chamber 43 at the opposite side of the piston 39 is arranged to be supplied with fluid under pressure under the control of the uncoupling valve 18 and of the magnet valve device 19 in the manner to be hereinafter described. Volume reservoir 17 is in constant communication with the chamber 43, hereinafter referred to as the pressure chamber, through a pipe 44 and branch pipe 45 and serves to enlarge the volume of the pressure chamber 43.

When the force of the pressure of fluid supplied to the pressure chamber 43 and acting on piston 39 increases sufficiently to overcome the opposing force of pressure in the brake pipe acting on the face of the valve piston 37, the valve piston 37 is urged downwardly into seated relation on an annular rib seat 46 formed in the passage 36 to close communication through the passage 36. It will be seen that if the piston 39 is larger in area than the valve piston 37 a fluid pressure less than brake pipe pressure may be effective on piston 39 to seat valve piston 37 on its seat 46. When fluid under pressure is released from the pressure chamber 43, pressure in the brake pipe acting on the face of the valve piston 37 urges it upwardly away from the annular rib seat 46 until the rear edge of the skirt portion of the valve piston seats on an annular gasket seat 47 mounted in the casing between the valve piston 37 and the operating piston 39, to prevent possible leakage of fluid under pressure from the brake pipe 14 past the valve piston 37 to the atmospheric chamber 41.

According to my invention, I provide a restricted passage 48 in the casing of the brake pipe cut-off valve which by-passes the valve piston and permits restricted flow of fluid under pressure from one section of the brake pipe 14 to the other when the valve piston 37 is seated on the annular rib seat 46. The purpose of the restricted passage 48 will be made more clear hereinafter.

The uncoupling valve device 18 may be of any suitable construction and is illustrated diagrammatically as comprising a casing containing a plug valve 51 which is shifted rotarily by an operating handle 52. The handle 52 is normally in the position shown and, in such position, a cavity 53 in the plug valve establishes communication between pipe 44 and an exhaust port 55. When the handle 52 is shifted to a position, indicated by the broken line, a port 56 in the plug valve connects a branch pipe 57 of the main reservoir pipe 15 to the pipe 44, the cavity 53 being shifted to close the connection between the pipe 44 and exhaust port 55.

Interposed in the pipe 44 between the uncoupling valve 18 and the brake pipe cut-off valve 16 are two check or one-way valves 21 and 22 and, connected to the pipe 44 between the two check valves 21 and 22, is a branch pipe 54 which leads to the operating cylinder (not shown) of the electric portion 13 of coupler 11. Check valve 21 is arranged so that it permits the supply of fluid under pressure through the pipe 44 from the main reservoir pipe 15 to the branch pipe 54 under the control of the uncoupling valve 18 but prevents reverse flow of fluid under pressure therepast. The check valve 22 is arranged so as to permit flow of fluid under pressure through the pipe 44 to the pressure chamber 43 of the brake pipe cut-off valve but prevents reverse flow of fluid under pressure therepast.

It will thus be seen that, as in the conventional manner described in the above-mentioned patents, the operation of the handle 52 of the uncoupling valve 18 to the position indicated by the broken line causes fluid at main reservoir pressure to be simultaneously supplied to the pressure chamber 43 of the brake pipe cut-off valve 16 and the operating cylinder (not shown) in the electric portion 13 of the coupler 11.

The magnet valve device 19 comprises a casing containing a pair of oppositely seating valves 61 and 62 of the poppet type and hereinafter referred to as the supply and release valves respectively, and an electromagnet 63 for operating the valves. Supply valve 61 is contained in a chamber 64 which is constantly connected to main reservoir pipe 15 through a branch pipe 65, and release valve 63 is contained in a chamber 66 which is constantly open to atmosphere through a port 67. The valves 61 and 62 have fluted stems which meet in end-to-end contact in a chamber 68 located between the chambers 64 and 66, the chamber 68 being connected by a branch pipe 69 to the pipe 44 and thus to the pressure chamber 43 of the brake pipe cut-off valve 16. Check valve 23 is interposed in the pipe 69 in such manner as to permit the flow of fluid under pressure therepast from the magnet valve 19 to the pressure chamber 43 of the brake pipe cut-off valve and to prevent reverse flow of fluid under pressure therepast.

Connected into the pipe 69 in parallel or by-passing relation to the check valve 23 is a branch pipe 71 which contains a restricted passage 72, the purpose of which will be made clear hereinafter.

Contained in the chamber 64 is a coil spring 73 which is interposed between supply valve 61 and the casing of the magnet valve device 19 in such manner as to yieldingly urge the supply valve 61 and the release valve 62 to seated and unseated positions, respectively, when the electromagnet 63 is deenergized. When the electromagnet 63 is energized, it exerts a downward force on the release valve 62, through a plunger 74, to shift the supply valve 61 and release valve 62 to unseated and seated positions, respectively, against the yielding resisting force of spring 73.

It will thus be seen that with the electromagnet 63 of the magnet valve device 19 deenergized and the supply valve 61 and the release valve 62 respectively seated and unseated as shown, communication is established from the chamber 68 to the atmospheric chamber 66 past the release valve 62. It will also be seen that when the electromagnet 63 is energized, communication is established past the unseated supply valve 61 through which fluid under pressure is supplied from the main reservoir pipe 15 and branch pipe 65 to the pipe 69 and connected pressure chamber 43 of the brake pipe cut-out valve 16. It will be observed also that, due to the arrangement of the check valve 23 and restricted passage 72, the supply of fluid under pressure to the pressure chamber 43 under the control of the magnet valve 19 is effected at a rapid rate, whereas the release of fluid under pressure from chamber 43 under the control of the magnet valve 19 is effected at a restricted rate.

The battery 24, the electromagnet 63 of the magnet valve device 19 and the contact fingers 33 on the electric portion 13 of the coupler 11 are connected in series relation in the simple circuit shown in Fig. 1. Accordingly, with the contact-carrying element 31 of the electric portion 13 of the coupler 11 in its projected position as shown in Fig. 1, the connection between the contact fingers 33 is interrupted and the electromagnet 63 of the magnet valve 19 is deenergized. Conversely, when the contact-carrying element 31 is in its retracted position as shown in Fig. 3, the connection is established between the contact fingers 33 and consequently current is supplied from the battery 24 to energize the electromagnet 63 of the magnet valve device 19.

*Operation of equipment*

Let it be assumed that the coupler 11 joins car 1 and car 2 as shown in Fig. 1, the handle 52 of the uncoupling valve 18 on each car being in its normal position as shown, and the electromagnet 63 of the magnet valve device 19 on each car being deenergized for the reason just explained. Pressure chamber 43 of the brake pipe cut-off valve 16 and its connected volume reservoir 17 on each car are thus vented to atmosphere through the pipe 69, restricted passage 72 and port 67 of the associated magnet valve device 19. Accordingly, the valve piston 37 of the brake pipe cut-off valve 16 on each car is actuated to its upper position by the pressure of fluid in the brake pipe 14 and communication is thus established from the section of the brake pipe 14 on car 1 to the section of brake pipe 14 on car 2 through the coupler 11. It will be understood that the main reservoir pipe 15 is likewise charged to its normal pressure, which is a predetermined amount higher than that to which the brake pipe 14 is charged, and the sections of the main reservoir pipe 15 on the two cars are connected through the coupler 11, as previously described.

If it is desired to uncouple the cars, the handle 52 of the uncoupling valve 18 on either car 1 or car 2 may be operated and for purposes of illustration let it be assumed that the uncoupling valve 18 on car 1 is shifted to the position indicated by the broken line. Accordingly, fluid under pressure is supplied from the main reservoir pipe 15 to the pressure chamber 43 of the brake pipe cut-off valve 16 through pipe 44 and to the operating cylinder, not shown, of the electric portion of the counterpart portion of coupler 11 on car 1 through pipe 54.

The operating cylinders in the counterpart portions of the coupler 11 are connected when the portions of the coupler are joined and thus fluid under pressure is also supplied to the operating cylinder of the counterpart portion of the coupler on car 2 and also to pressure chamber 43 of brake pipe cut-off valve 16 on car 2 through pipe 54 on car 2.

Due to the higher pressure in the main reservoir pipe 15 as compared to brake pipe pressure, and also to the greater effective area of the piston 39 if such is the case, valve piston 37 is urged downwardly against the resisting force of the brake pipe pressure into seated relation on the annular rib seat 46. Accordingly, the brake pipe cut-off valve on each car closes off the connection between the main or intermediate section of the brake pipe 14 on the car and the section of the brake pipe 14 between the brake pipe cut-off valve 16 and the coupler 11 except for the connection through the restricted passage 48.

In the manner similar to that described in the above-mentioned patents, the supply of fluid under pressure through the branch pipe 54 to the operating cylinders of the electric portion 13 of the counterpart portions of the coupler 11 is effective to cause immediate retraction of each of the contact-carrying elements 31 and, subsequently, the uncoupling of the counterpart portions of the coupler 11 and the separation of the cars.

Upon the retraction of the contact-carrying element 31 of the coupler portion on each car, the electromagnet 63 of the magnet valve device 19 on each car is immediately energized, due to engagement of contact-bridging member 32 with both contact fingers 33, and thus fluid under pressure is also supplied to the pressure chamber 43 of the brake pipe cut-off valve 16 on each car under the control of the corresponding magnet valve 19.

The separation of the counterpart coupler portions from each other opens the pipes 54 to atmosphere at the face of the coupler portions and, accordingly, the handle 52 of the uncoupling valve 18 on car 1 is immediately returned to its normal position, upon the separation of the cars, to prevent waste of fluid at main reservoir pipe pressure supplied to pipe 54 on car 1. Check valve 22 on each car prevents loss of fluid under pressure to pipe 54 from the pressure chamber 43 of the corresponding brake pipe cut-off valve 16 and thus the valve piston 37 of each cut-off valve 16 continues to remain seated on its associated annular rib seat 46.

It will be apparent from Fig. 2 that in the act of separation of the parts of the coupler carried respectively on car 1 and car 2, the tappet valves 25 are momentarily maintained in unseated position, due to the venting of the back of the valve by the associated check valve 27, sufficiently long for that section of the brake pipe between the brake pipe cut-off valve 16 and the face of the coupler on each car to be vented to atmosphere before the tappet valve 25 is automatically reseated.

In the conventional type of automatic coupler control wherein the brake pipe cut-off valve is automatically opened upon separation of the parts of the coupler, the momentary sudden rapid reduction of the pressure in the brake pipe 14 on the car by flow of fluid under pressure into that section of the brake pipe 14 between the brake pipe cut-off valve 16 and the coupler which was vented to atmosphere may produce an undesired emergency application of the brakes on the cars due to the response of the sensitive vent valve devices (not shown) connected to the brake pipe.

I avoid such an occurrence by maintaining the valve piston 37 of the brake pipe cut-off valve 16 on each car seated, under the control of the corresponding magnet valve 19, while the counterpart portions of a coupler are separated, the reduction of the pressure in the brake pipe 14 on each car by flow of fluid under pressure into the vented section at the end of the brake pipe through the restricted passage 48 in the brake pipe cut-off valve 16 on each car being restricted to a sufficiently low rate that the vent valve devices in the brake pipe on each car will not respond thereto to effect an undesired emergency application of the brakes on the cars.

In this connection, it should be kept in mind that the check valve 22 prevents the reduction of pressure in the pressure chamber 43 of each brake pipe cut-off valve 16 through the pipe 54 which, as previously explained, is vented to atmosphere at the face of the corresponding coupler part when the cars are separated.

Assuming now that car 1 and car 2 are separated and that it is desired to couple them, the parts of the coupler 11 on the cars automatically cooperate and lock in the conventional manner to establish the connection between the sections of the brake pipe 14 and main reservoir pipe 15 on the two cars when the two cars are moved together. Upon the establishment of the connection between the sections of the main reservoir pipe 15 on the two cars as a result of the unseating of tappet valves, similar to the tappet valves 25, a communication is established through which fluid under pressure is supplied to a chamber (not shown), in the electric portion 13 of each counterpart portion of the coupler 11, that contains a so-called trigger release piston. After a predetermined time interval the pressure on this piston increases sufficiently to move the piston and cause it to unlatch a trigger mechanism which renders a spring effective to shift the contact-carrying element 31 of the corresponding coupler part from its retracted position to its projected position, the two contact-carrying elements 31 on the two parts of the coupler cooperating to establish connection between the sections of the train wires on car 1 and on car 2.

Upon the interruption of the connection between the two contact fingers 33 on each counterpart portion of the coupler by the shifting of the contact-carrying element 31 thereof to its projected position, the electromagnet 63 of the corresponding magnet valve device 19 is deenergized and consequently fluid under pressure is released at a restricted rate, determined by the size of the volume reservoir 17 and the flow area of the restricted passage 72, from the pressure chamber 43 of each brake pipe cut-off valve 16 to atmosphere through the exhaust port 67 of the associated magnet valve device 19. Valve piston 37 is thus prevented from unseating for a predetermined interval of time after magnet valve 19 is deenergized.

In the act of coupling the two cars, the tappet valves 25 are unseated before the counterpart portions of the coupler are locked together in sealed relation, and thus the end section of the brake pipe on each car is vented to atmosphere. Due to the restricted flow of fluid under pressure through passage 48 from the charged portion of the brake pipe 14 on each of the cars to the end section of the brake pipe 14 between the brake pipe cut-off valve 16 and the tappet valve 25, the unseating of the tappet valves 25 is ineffective to cause such reduction in brake pipe pressure as might cause response of the sensitive vent valves connected to the brake pipe on each car to produce an emergency application of the brakes. Furthermore, the charging of the end sections of the brake pipe through the restricted passage 48 in each of the brake pipe cut-off valves after the counterpart portions of the coupler are locked together in sealed relation prevents such reduction in the brake pipe pressure on the cars as will produce an undesired emergency application of the brakes when the valve piston 37 of the brake pipe cut-off valve 16 is subsequently unseated from its valve seat 46 as a result of the timed reduction of the pressure in chamber 43 of the brake pipe cut-off valve through the exhaust port 67 of the magnet valve device 19. Thus, at no time during the coupling operation is a reduction of the pressure in the charged portion of brake pipe produced which is sufficiently rapid to cause operation of the vent valve devices, not shown, and a consequent undesired emergency application of the brakes.

It will be understood that the operating mechanism on the part of the coupler 11 carried by car 1 and the operating mechanism of the part of the coupler 11 carried by the car 2 are simultaneously operated in the conventional manner described in the above-mentioned patents, so that the brake pipe cut-off valves 16 and the magnet valve devices 19 on both cars are simultaneously operated to perform similar functions.

In the event that car 2 has been set-off and the pressure in the brake pipe 14 thereon reduced to effect an application of the brakes to hold the car at a standstill, the coupling of car 1 to car 2 will likewise be ineffective to produce an undesired emergency application of the brakes on car 1 because of the restricted flow of fluid under pressure through passage 48 of brake pipe cut-off valve 16 on car 1 from the section of brake pipe 14 on car 1 which is charged to the normal pressure to the section of the brake pipe 14 carried on car 2 and charged to a reduced pressure. Thus, when the valve piston 37 of the brake pipe cut-off valves 16 on car 1 and car 2, respectively, is unseated in response to the deenergization of the electromagnet of the magnet valve devices 19 on the cars, the differential of the pressure in the brake pipe 14 on the car 1 and in the brake pipe 14 on car 2 is insufficient to cause a reduction of pressure in the brake pipe 14 on car 1 sufficiently rapid to cause an undesired emergency application of the brakes.

*Summary*

Summarizing, it will be seen that I have disclosed mechanism operating in association with automatic couplers for railway cars for preventing undesired emergency application of the brakes on cars being coupled or uncoupled, due to the sudden rapid reduction of pressure in charged portions of the brake pipe on the cars by flow of fluid under pressure therefrom to vented portions or portions charged at a lower pressure.

Specifically, the apparatus constituting my invention includes a magnet valve device controlled according to the position of a shiftable element on the car coupler for controlling the operation of the brake pipe cut-off valve on each of the cars adjacent the coupler. The magnet valve device is so controlled as to cause opening of the brake pipe cut-off valve when the parts of the coupler on the two cars are joined. Suitable delay means prevents the brake pipe cut-off valve from opening until after the expiration of a predetermined time following the coupling of the cars. A restricted passage in by-pass relation to the valve of the brake pipe cut-off valve permits flow of fluid under pressure from the charged portion of the brake pipe to the vented end portion thereof to increase the pressure therein sufficiently so that, when the valve of the brake pipe cut-off valve does open, there is insufficient differential between the parts of the brake pipe connected by the brake pipe cut-off valve to cause a sufficiently rapid reduction of the charged portion of the brake pipe to result in an undesired emergency application of the brakes.

When the cars are uncoupled, the magnet valve device is conditioned automatically to cause the brake pipe cut-off valve to be closed and to remain closed as long as the cars are uncoupled, the restricted passage in the brake pipe cut-off valve preventing any except a slow rate of reduction in brake pipe pressure which may result upon separation of the counterpart portions of the automatic coupler.

While I have shown only one specific embodiment of my invention, it will be apparent that various omissions, additions or modifications may be made in the embodiment shown without departing from the spirit of my invention. It is accordingly not my intention to limit the scope of my invention except as it is necessitated by the scope of the prior art.

Having now described my invention, what I claim as new and desire to secure by Letters Patent, is:

1. In a vehicle brake system, in combination, a brake pipe having two sections, valve means controlling communication between said two sections of the brake pipe, and electrical means operatively controlled in response to coupling or uncoupling of the vehicle to another vehicle for controlling operation of said valve means.

2. In a vehicle brake system, in combination, a brake pipe having two sections, valve means controlling communication between said two sections of the brake pipe and means operative in response to coupling or uncoupling of the vehicle to another vehicle for controlling operation of said valve means, and means providing a restricted communication between said two sections of the brake pipe which by-passes said valve means.

3. In a brake equipment for a train of cars, in combination, a coupler having cooperative counterpart portions on two cars for joining the two cars, a brake pipe having sections on each of said cars connected through said coupler, said brake pipe being normally charged with fluid under pressure and a sudden rapid reduction of the pressure in the brake pipe being effective to cause an application of the brakes on the cars, valve means on each of said cars adjacent the coupler operative from one position in which communication through the brake pipe is opened to a different position in which communication through the brake pipe is closed, and electroresponsive means automatically controlled by the coupling and uncoupling of the counterpart portions of the said coupler for controlling the operation of said valve means.

4. In a brake equipment for a train of cars, in combination, a coupler having cooperative counterpart portions on two cars for joining the two cars, a brake pipe having sections on each of said two cars connected through said coupler, valve means on each of said cars adjacent the coupler adapted in one condition thereof to provide a relatively unrestricted communication between the section of the brake pipe on a car and the associated counterpart portion of the coupler on that car and effective in another condition thereof to provide only a restricted communication from the section of the brake pipe on the car to the counterpart portion of the coupler on that car, and means automatically controlled by the coupling and uncoupling of the counterpart portions of the coupler for controlling the conditioning of said valve device in one or the other of said conditions.

5. In a brake equipment for a train of cars, in combination, a coupler having cooperative counterpart portions on the two cars for joining the two cars, a brake pipe having on each of said two cars sections thereof that are connected through said coupler, said brake pipe being normally charged with fluid under pressure and a reduction of the pressure in the brake pipe due to coupling and uncoupling of the counterpart portions of the said coupler being adapted to cause escape of fluid under pressure from the brake pipe and possible consequent undesired application of the brakes on the cars, valve means on each of said two cars adjacent the coupler, said valve means having a normal position in which it establishes unrestricted communication through the brake pipe and being operative to a position for preventing reduction of pressure in the section of brake pipe on the corresponding car caused by escape of fluid under pressure from the brake pipe at the coupler upon coupling and uncoupling of the counterpart portions of the coupler except at a restricted rate insufficient to cause an undesired application of the brakes on the cars, manually operable means for effecting operation of the valve means out of its normal position to the last said position prior to uncoupling of the counterpart portions of the coupler, and means operative upon the initiation of the uncoupling of the counterpart portions of the coupler for maintaining said valve means in the last said position and operative automatically in response to the coupling of said two cars by said coupler for restoring said valve means to its normal position.

6. In a brake equipment for a train of cars, in combination, a coupler having cooperative counterpart portions on the two cars for joining the two cars, a brake pipe having on each of said two cars sections thereof that are connected through said coupler, said brake pipe being normally charged with fluid under pressure and a reduction of the pressure in the brake pipe due to coupling and uncoupling of the counterpart portions of the said coupler being adapted to cause escape of fluid under pressure from the brake pipe and possible consequent undesired application of the brakes on the cars, valve means on each of said two cars adjacent the coupler, said valve means having a normal position in which it establishes unrestricted communication through the brake pipe and being operative to a position for preventing reduction of pressure in the section of brake pipe on the corresponding car caused by escape of fluid under pressure from the brake pipe at the coupler upon coupling and uncoupling of the counterpart portions of the coupler except at a restricted rate insufficient to cause an undesired application of the brakes on the cars, manually operable means for effecting operation of the valve means out of its normal position to the last said position prior to uncoupling of the counterpart portions of the coupler, means operative upon the initiation of the uncoupling of the counterpart portions of the coupler for maintaining said valve means in the last said position and operative automatically in response to the coupling of said two cars by said coupler for restoring said valve means to its normal position, and means for delaying for a predetermined time the restoration of said valve means to its normal position in response to the operation of the last said means.

7. In a brake equipment for a train of cars, in combination, a brake pipe in which variations of pressure are effective to control the brakes on the cars, a car coupler for connecting two cars and adapted to establish communication between sections of the brake pipe on the two cars, a brake pipe cut-off valve device adjacent the coupler on each car for closing the brake pipe, a shiftable element on each counterpart portion of the coupler adapted to have one position when the two cars are joined by the coupler and a different position when the cars are separated, and electroresponsive means controlled according to the position of said element on each car for controlling the operation of the corresponding brake pipe cut-off valve.

8. In a brake equipment for a train of cars, in combination, a brake pipe in which variations of pressure are effective to control the brakes on the cars of the train, a car coupler having counterpart portions on each of two cars adapted to cooperate to couple the cars, cooperating valves on the counterpart portions of the coupler adapted to be operated to establish communication between sections of the brake pipe on the two cars and adapted when the cars are uncoupled to close off the brake pipe on the corresponding car, a brake pipe cut-off valve on each car adjacent the coupler also operative to close off the brake pipe, a shiftable element on each counterpart portion of the coupler adapted to have one position when the counterpart portions of the coupler are joined and a different position when the counterpart portions are separated, and electroresponsive means on each car controlled according to the position of the element associated with the counterpart portion of the coupler on that car for controlling the operation of the brake pipe cut-off valve on that car.

9. In a brake equipment for a train of cars, in combination, a brake pipe variations of pressure in which are effective to control the brakes on the cars, a coupler having counterpart portions on each of two cars adapted to be coupled to join the two cars, two tappet valves, one for each counterpart portion of the coupler, adapted to mutually cooperate to establish a communication connecting the sections of the brake pipe on the two cars when the cars are coupled by said coupler and adapted to close off the brake pipe on the corresponding car at the coupler when the cars are separated, a valve device on each of the cars adjacent the coupler operative to close communication through the sections of the brake pipe on the corresponding car, and means providing a restricted communication between the sections of the brake pipe on each car in by-passing relation to the corresponding said valve device.

10. In a brake equipment for a train of cars, in combination, a brake pipe variations of pressure in which control the brakes on the cars, a coupler having counterpart portions on each of two cars for joining the two cars, two tappet valves, one on each counterpart portion of the coupler, adapted to mutually cooperate when the cars are coupled to establish communication between the section of the brake pipe on one car and the section of the brake pipe on the other car and to close off the brake pipe on each corresponding car when the cars are separated, valve means on each car adjacent the counterpart portion of the coupler on that car operative to close off the end section of the brake pipe from the charged portion of the brake pipe prior to uncoupling of the cars to prevent undesired reduction of the pressure in the brake pipe and the consequent undesired application of the brakes, and means for charging the section of the brake pipe on a car between the valve means on that car and the counterpart portion of the coupler on that car to prevent undesired reduction of pressure in the brake pipe and thus an undesired application of the brakes on the car when the said valve means subsequently opens.

11. In a brake equipment for a train of cars, in combination, a brake pipe effective when charged to a normal pressure to effect the release of the brakes on the cars and effective upon a reduction of the pressure in the brake pipe to effect application of the brakes on the cars, an automatic coupler comprising cooperative counterpart portions on each of two cars adapted to join the two cars and to establish communication through which the section of the brake pipe on one car is connected to a section of the brake pipe on the other car, valve means operative to close off the end section of the brake pipe, when the cars are uncoupled, to prevent reduction of pressure in the charged portion resulting in undesired application of the brakes, manually operated means for effecting operation of said valve means to close off the end section of the brake pipe and to initiate uncoupling of the counterpart portions of said automatic coupler, and means operated automatically upon the uncoupling of the counterpart portions of the coupler for causing said valve means to be maintained in closed position independently of the manually operated means as long as the counterpart portions of the coupler are separated.

12. In a brake equipment for a train of cars, in combination, a brake pipe effective when charged to a normal pressure to effect the release of the brakes on the cars and effective upon a reduction of the pressure in the brake pipe to effect application of the brakes on the cars, an automatic coupler comprising cooperative counterpart portions on each of two cars adapted to join the two cars and to establish communication through which the section of the brake pipe on one car is connected to a section of the brake pipe on the other car, valve means operative to close off the end section of the brake pipe, when the cars are uncoupled, to prevent reduction of pressure in the charged portion resulting in undesired application of the brakes, manually operated means for effecting operation of said valve means to close off the end section of the brake pipe and to initiate uncoupling of the counterpart portions of said automatic coupler, and means operated automatically upon the uncoupling of the counterpart portions of the coupler for maintaining said valve means in closed position independently of the manually operated means as long as the counterpart portions of the coupler are separated, and operative automatically when the counterpart portions of the coupler are joined, in coupling the cars, for effecting the opening of said valve means independently of said manually operated means.

13. In a brake equipment for a train of cars, in combination, a brake pipe effective when charged to a normal pressure to effect the release of the brakes on the cars and effective upon a reduction of the pressure in the brake pipe to effect application of the brakes on the cars, an automatic coupler comprising cooperative counterpart portions on each of two cars adapted to join the two cars and to establish communication through which the section of the brake pipe on one car is connected to a section of the brake pipe on the other car, valve means operative to close off the end section of the brake pipe, when the cars are uncoupled, to prevent reduction of pressure in the charged portion resulting in undesired application of the brakes, means for effecting operation of said valve means to close off the end section of the brake pipe and to initiate uncoupling of the counterpart portions of said automatic coupler, means operated automatically upon the uncoupling of the counterpart portions of the coupler for maintaining said valve means in closed position as long as the counterpart portions of the coupler are separated, and operative automatically when the counterpart portions of the coupler are joined, in coupling the cars, for effecting the opening of said valve means, and means for delaying the operation of the said valve means to open communication through the brake pipe in response to the operation of the last said means for a predetermined time following the coupling of the cars.

14. In a brake equipment for a train of cars, in combination, a brake pipe normally charged with fluid at a certain pressure a reduction of pressure from which is effective to cause an application of the brakes on the cars, a train wire having sections on each car, an automatic coupler having counterpart portions on each of two cars, cooperating valve means on the counterpart portions of the coupler for establishing communication between the sections of the brake pipe on the two cars when the cars are coupled, a shiftable element on each of the counterpart portions of the coupler, said elements being adapted to cooperate with each other to establish an electrical connection between the sections of the train wire on the two cars when the cars are coupled and adapted to be shifted to other positions respectively wherein the electrical connection is interrupted while the cars are still coupled prior to uncoupling thereof, a valve device on each car adjacent the portion of the coupler thereon operative to close off the end section of the brake pipe between the said valve device and the valve means on the counterpart portion of the coupler from the remaining portion of the brake pipe, means for effecting operation of each valve device to close off the end section of the brake pipe on the corresponding car and also effective to cause operation of the automatic coupler to uncouple the cars, and means on each car controlled by the shiftable element of the corresponding counterpart portion of said coupler for causing the corresponding valve device to be maintained in position to close off the end section of the brake pipe on that car as long as the cars are uncoupled.

15. In a brake equipment for a train of cars, in combination, a brake pipe normally charged with fluid at a certain pressure a reduction of pressure from which is effective to cause an application of the brakes on the cars, a train wire having sections on each car, an automatic coupler having counterpart portions on each of two cars, cooperating valve means on the counterpart portions of the coupler for establishing communication between the sections of the brake pipe on the two cars when the cars are coupled, a shiftable element on each of the counterpart portions of the coupler, said elements being adapted to cooperate with each other to establish an electrical connection between the sections of the train wire on the two cars when the cars are coupled and adapted to be shifted respectively to other positions respectively wherein the electrical connection is interrupted while the cars are still coupled prior to uncoupling thereof, a valve device on each car adjacent the portion of the coupler thereon operative to close off the end section of the brake pipe between the said valve device and the valve means on the counterpart portion of the coupler from the remaining portion of the brake pipe, means for effecting operation of each valve device to close off the end section of the brake pipe on the corresponding car and also effective to cause operation of the automatic coupler to uncouple the cars, and means on each car controlled by the shiftable element of the corresponding counterpart portion of said coupler for causing the corresponding valve device to be maintained in position to close off the end section of the brake pipe on that car as long as the cars are uncoupled, and effective when the cars are coupled to effect operation of the said valve device to open communication between the charged portion of the brake pipe and the end section thereof.

16. In a brake equipment for a train of cars, in combination, a brake pipe normally charged with fluid at a certain pressure a reduction of pressure from which is effective to cause an application of the brakes on the cars, a train wire having sections on each car, an automatic coupler having counterpart portions on each of two cars, cooperating valve means on the counterpart portions of the coupler for establishing communication between the sections of the brake pipe on the two cars when the cars are coupled, cooperating shiftable elements on the counterpart portions of the coupler adapted to be shifted to a position to establish an electrical connection between the sections of the train wire on the two cars when the cars are coupled and adapted to be shifted to different positions respectively when the cars are separated, a valve device on each car adjacent the portion of the coupler thereon operative to close off the end section of the brake pipe between said valve device and the valve means on the counterpart portion of the coupler from the remaining portion of the brake pipe, means for effecting operation of each valve device to close off the end section of the brake pipe on the corresponding car and also effective to cause operation of the automatic coupler to uncouple the cars, means on each car controlled according to the position of the shiftable element of the corresponding counterpart portion of said coupler for causing the corresponding valve device to be maintained in position to close off the end section of the brake pipe on that car as long as the cars are uncoupled, and effective when the cars are coupled to effect operation of the said valve device to open communication between the charged portion of the brake pipe and the end section thereof, and means for delaying for a predetermined time the operation of the said valve device on each car to open communication between the charged portion of the brake pipe and the end section thereof on that car in response to the operation of the last said means.

17. In a brake equipment for a train of cars, in combination, a brake pipe normally charged with fluid at a certain pressure a reduction of pressure from which is effective to cause an application of the brakes on the cars, a train wire having sections on each car, an automatic coupler having counterpart portions on each of two cars, cooperating valve means on the counterpart portions of the coupler for establishing communication between the sections of the brake pipe on the two cars when the cars are coupled, cooperating shiftable elements on the counterpart portions of the coupler adapted to be shifted to a position to establish an electrical connection between the sections of the train wire on the two cars when the cars are coupled and adapted to be shifted to different positions respectively when the cars are separated, a valve device on each car adjacent the portion of the coupler thereon operative to close off the end section of the brake pipe between the said valve device and the valve means on the counterpart portion of the coupler from the remaining portion of the brake pipe, means for effecting operation of each valve device to close off the end section of the brake pipe on the corresponding car and also effective to cause operation of the automatic coupler to uncouple the cars, means on each car controlled according to the position of the shiftable element of the corresponding counterpart portion of said coupler for causing the corresponding valve device to be maintained in position to close off the end section of the brake pipe on that car as long as the cars are uncoupled, and effective when the cars are coupled to effect operation of the said valve device to open communication between the charged portion of the brake pipe and the end section thereof, means for delaying for a predetermined time the operation of the said valve device on each car to open communication between the charged portion of the brake pipe and the end section thereof on that car in response to the operation of the last said means, and means for charging the end section of the brake pipe on each car with fluid under pressure to prevent the undesired reduction of pressure in the charged portion of the brake pipe on the car resulting in an undesired application of the brakes on the car upon the operation of said valve device to open communication through the brake pipe.

ROY R. STEVENS.